United States Patent
Hotham

(10) Patent No.: US 10,834,893 B2
(45) Date of Patent: Nov. 17, 2020

(54) HAY FEEDER

(71) Applicant: Kimberley Hotham, Feversham (CA)

(72) Inventor: Kimberley Hotham, Feversham (CA)

( * ) Notice: Subject to any disclaimer, the term of this patent is extended or adjusted under 35 U.S.C. 154(b) by 148 days.

(21) Appl. No.: 16/055,064

(22) Filed: Aug. 4, 2018

(65) Prior Publication Data
US 2020/0037575 A1 Feb. 6, 2020

(51) Int. Cl.
*A01K 5/01* (2006.01)
*A01K 1/10* (2006.01)

(52) U.S. Cl.
CPC ............... *A01K 1/105* (2013.01); *A01K 5/01* (2013.01)

(58) Field of Classification Search
CPC . A01K 5/01; A01K 1/10; A01K 5/008; A01K 5/00; A01K 5/0107; A01K 5/105
USPC ................... 119/60, 58, 59, 61.1, 63, 65
See application file for complete search history.

(56) References Cited

U.S. PATENT DOCUMENTS

| | | | | |
|---|---|---|---|---|
| 5,189,985 A * | 3/1993 | Brady | ...................... | A01K 5/01 119/51.03 |
| 5,477,811 A * | 12/1995 | Nobles | ...................... | A01K 5/01 119/60 |
| 5,496,145 A * | 3/1996 | Monin | ...................... | A01K 5/01 119/59 |
| 5,509,377 A * | 4/1996 | Franklin | .................. | A01K 1/10 119/60 |
| 5,586,519 A * | 12/1996 | Wilkinson | ............... | A01K 5/01 119/60 |
| D397,530 S * | 8/1998 | Lile | .............................. | D30/131 |
| 6,789,504 B1 * | 9/2004 | O'Neill | ..................... | A01K 1/10 119/58 |
| 7,644,682 B2 * | 1/2010 | Lerner | ..................... | A01K 5/01 119/58 |
| 2006/0272587 A1 * | 12/2006 | Gordon | .................... | A01K 5/01 119/61.1 |
| 2012/0279453 A1 * | 11/2012 | Goodhart | ................ | A01K 5/01 119/58 |
| 2015/0122188 A1 * | 5/2015 | Webster | ................. | A01K 5/008 119/65 |
| 2015/0313174 A1 * | 11/2015 | Gibbons | ................. | A01K 5/01 119/60 |
| 2016/0050883 A1 * | 2/2016 | Davis | ....................... | A01K 5/00 119/60 |

FOREIGN PATENT DOCUMENTS

| | | | | |
|---|---|---|---|---|
| GB | 2425704 A | * | 11/2006 | ............... A01K 5/01 |
| GB | 2425928 A | * | 11/2006 | ............... A01K 5/01 |

\* cited by examiner

*Primary Examiner* — Yvonne R Abbott-Lewis
(74) *Attorney, Agent, or Firm* — Elias Borges

(57) ABSTRACT

Here is disclosed a hay feeder for enclosing a cylindrical bail of hay having opposite first and second longitudinal portions. The hay feeder includes a semi-cylindrical housing dimensioned to enclose the first longitudinal portion of the cylindrical bail, the semi-cylindrical housing having an arched bottom and an open top having a rim. A lid is provided which is configured to fit the rim to close the open top. The lid includes a frame supporting a flexible net which is dimensioned to enclose the second longitudinal portion of the cylindrical bail when the lid is closed on the semi-cylindrical housing.

3 Claims, 2 Drawing Sheets

HAY FEEDER

FIELD OF THE INVENTION

The invention relates generally to devices for feeding hay to livestock.

BACKGROUND OF THE INVENTION

Livestock such as cattle and horses are often fed hay which is laid out for them in a field. To ensure that the feeding of hay to livestock is as efficient as possible, the hay is usually bundled as large cylindrical bails which are then rolled out onto the field as required. The bails of hay are exposed to the livestock and they are free to sat the hay as they desire. In order to prevent the hay bail from being trampled by the livestock, the hay bail can be contained in a large hay feeder which generally consists of a large rectangular housing configured to contain the bay bail and lift it off the ground while exposing the hay bail to the livestock. Newer hay feeders are provided with a flexible netting which is draped over the hay bail to further contain the hay and prevent it from falling out of the feeder while still allowing the animals to feed on the hay. Unfortunately, these hay feeders are relatively heavy and require a tractor to move. Additionally, the hay bail must be lifted off the ground and positioned within the feeder, therefore requiring the use of a tractor as the hay hails are too large and heavy to be lifted by hand. Therefore, an improved hay feeder which is lighter and more convenient to use is required.

SUMMARY OF THE INVENTION

In accordance with one aspect of the present invention, there is provided a hay feeder for enclosing a cylindrical bail of hay which can be loaded by simply rolling a bail of hay into the feeder by hand. The hay feeder includes a housing having a bottom and side walls formed as a semi-cylindrical trough. The housing has an open top, an interior and a rim surrounding the open top, the rim having opposite front and back edges. A lid is pivotally coupled to the back edge of the rim and dimensioned to cover the open top, the lid being movable between open and closed positions. The lid has a rectangular frame supporting a flexible net. The semi-cylindrical tough is dimensioned to contain a first longitudinal portion of the cylindrical bail of hay. The flexible net is configured such that the net covers over a second longitudinal portion of the cylindrical bail of hay when the lid is closed.

In accordance with another aspect of the present invention, there is provided a hay feeder for enclosing a cylindrical bail of hay having opposite first and second longitudinal portions. The hay feeder includes a semi-cylindrical housing dimensioned to enclose the first longitudinal portion of the cylindrical bail, the semi-cylindrical housing having an arched bottom and an open top having a rim. A lid is provided which is configured to fit the rim to close the open top. The lid includes a frame supporting a flexible net which is dimensioned to enclose the second longitudinal portion of the cylindrical bail when the lid is closed on the semi-cylindrical housing.

In accordance with another aspect of the present invention, there is provided a method of loading a hay bail into a hay feeder as described above. The method includes the steps of positioning the lid to the side of the housing and then rolling the cylindrical hay bail onto the lid and pressing down on the rim where the lid is connected with sufficient force to lift the trough and position it towards the cylindrical hay bail. The hay bail is then rolled over the lid and into the trough. Finally, the last step is to close the lid with the cylindrical hay bail positioned within the trough.

With the foregoing in view, and other advantages as will become apparent to those skilled in the art to which this invention relates as this specification proceeds, the invention is herein described by reference to the accompanying drawings forming a part hereof which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 4:
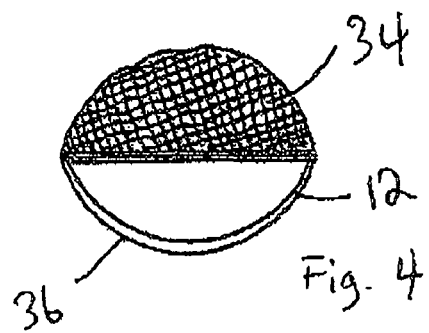
FIG. 4 is a side view of the hay feeder shown in FIG. 1 showing the lid portion in a closed position extended.
Figure 3:
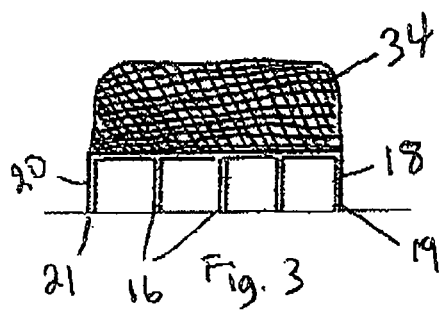
FIG. 3 is a front view of the hay feeder shown in FIG. 1 showing the lid portion in a closed position with the net portion extended.
Figure 2:
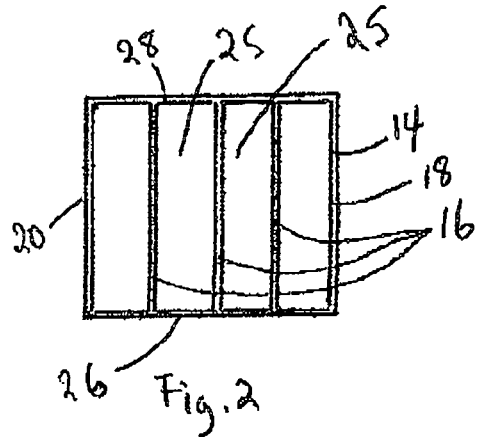
FIG. 2 is a top view of the hay feeder shown in FIG. 1 with the flexible net removed to better see the features of the invention.
Figure 1:
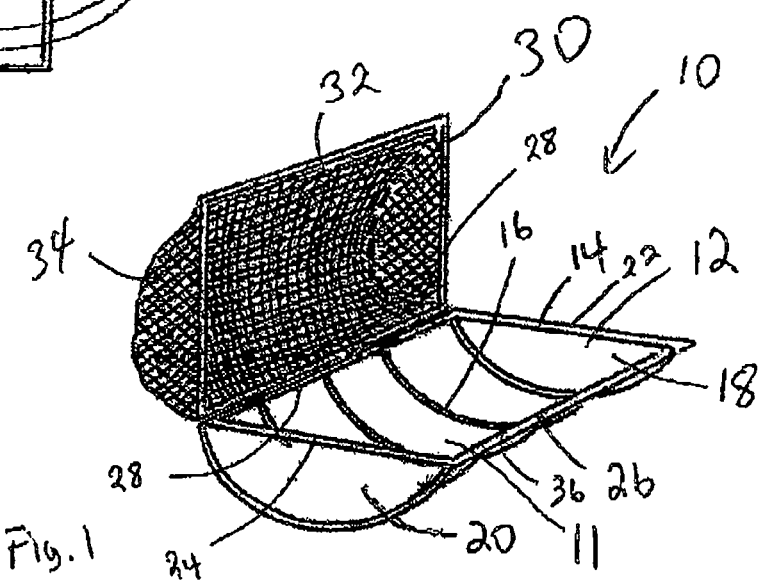
FIG. 1 is a perspective view of a hay feeder made in accordance with the present invention showing the lid portion of the hay feeder in an open position.
Figure 5:
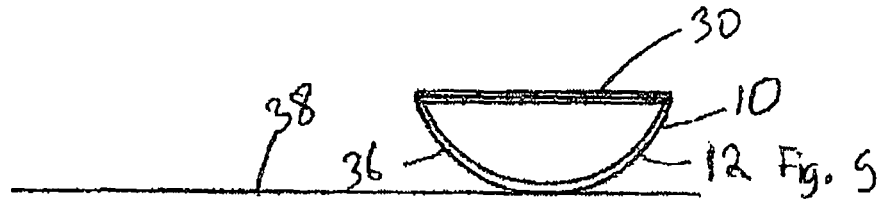
FIG. 5 is a side view of the hay feeder shown in FIG. 1 showing the lid portion in a closed position with the net portion retracted.
Figure 6:
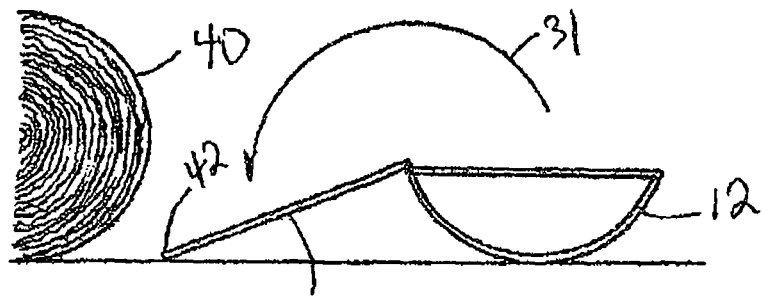
FIG. 6 is a side view of the hay feeder of the present invention with the lid portion in its most lowered position and a hay bail positioned adjacent the lid.
Figure 7:
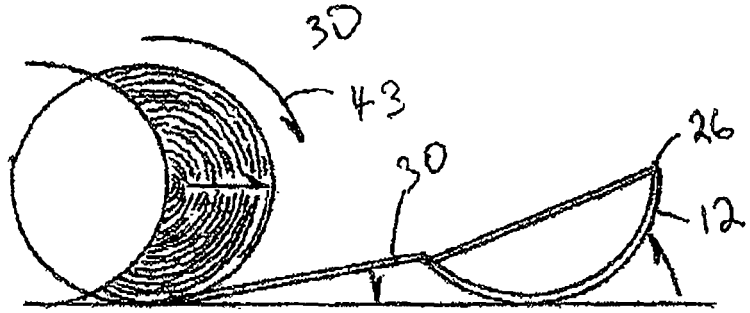
FIG. 7 is a side view of the hay feeder shown in FIG. 6 with the hay bail being rolled onto the lid portion.
Figure 8:
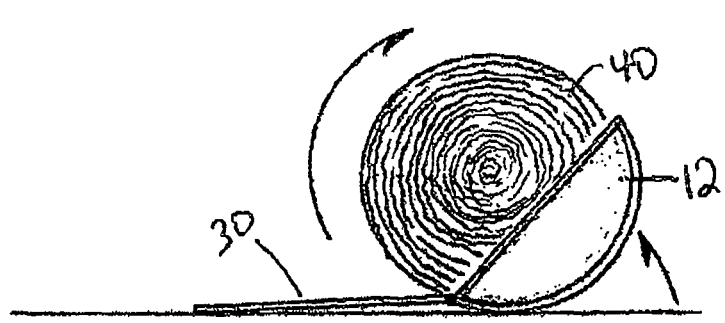
FIG. 8 is a side view of the hay feeder shown in FIG. 7 showing the hay bay being rolled into the trough portion of the feeder and the lid portion being close.
Figure 8:
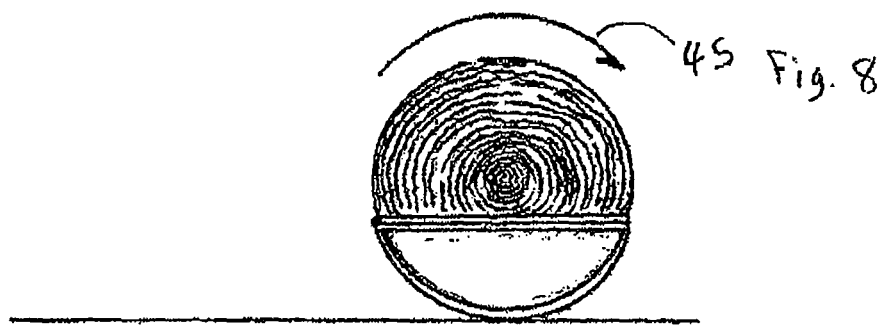

Referring to FIGS. 1 through 4, a hay feeder made in accordance with the present invention, shown generally a item 10, consists of a semi-cylindrical barrel shaped trough portion 12 made of a rectangular steel frame 14 having a plurality of curved elongated members 16 welded thereto. Elongated members 16 are preferably made from steel tubing and are curved in the shape of a semicircle to form an arched bottom 36. Rectangular frame 14 is preferably fabricated from steel tubing and has opposite ends 22 and 24, front side 26 and back side (or rear side) 28. Elongated members 16 each have one end welded to front side 26 of rectangular frame 14 and an opposite end welded to back side 28 of the rectangular frame. Semi-circular side members 18 and 20 are welded to ends 22 and 24 of frame 14, respectively. Semi-circular side members 18 and 20 are preferably consist of relatively thin steel plates and have bottom edges 19 and 21, respectively, which are parallel to elongated members 16. If a less rigid and lighter weight construction is required, side members 18 and 20 may consist of curved elongated members identical to elongated members 16 instead of steel plates. Elongated members 16 are spaced apart to form drainage openings 25 between the elongated members and between the elongated members and semicircular members 18 and 20. Lid 30 is pivotally connected to back end 28 and is dimensioned to fit over rim (rectangular frame) 14 to close off open top 11 of trough/housing 12. Lid 30 consists of a steel rectangular frame 32 supporting a large flexible net 34. As can be seen in FIGS. 3 and 4, net 34 is extendable so that feeder 10 is cylindrical when the net is extended.

Referring now to FIGS. 5 through 8 the method of loading hay feeder 10 with cylindrical hay bail 40 shall now be discussed. Hay feeder 10 is positioned on the surface of ground 38 with the curved bottom 36 of trough 12 resting on the ground. Lid 30 is then swung open as illustrated by arrow 31 so that a distal end 42 of lid 30 touches ground 38 and the lid is to the side of trough/housing 12 (see FIG. 6). Cylindrical hay bail 40 is then rolled adjacent lid 30 (FIG. 6) and then rolled on top of lid 30 (se FIG. 7) by rolling the bail in the direction indicated by arrow 43. The hay bail is then rolled across lid 30 and into trough 12. Lid 30 is then swung over the hay bail by moving it in the direction indicated by arrow 45.

The hay feeder made in accordance with this invention has several advantages over other hay feeders. Firstly, since hay bail 40 is never lifted off the ground and is merely rolled across the ground and across lid 30, the operation of loading the hay bail into the hay feeder can be done by hand and without the aid of a tractor or powered equipment. Furthermore, since feeder 10 is made from mostly steel tubing, it is relatively light weight and can be moved about the surface of the ground without the need of a tractor. The feeder is also highly compact being only slightly larger than the hay bail itself therefore it can be easily stored and positioned closer together.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A hay feeder for enclosing a cylindrical bale of hay, the hay feeder comprising a housing having a bottom and side walls formed as a semi-cylindrical trough, the housing having an open top, an interior and a rim surrounding the open top, the rim having opposite front and back edges, a lid pivotally coupled to the back edge of the rim and dimensioned to cover the open top, the lid being movable between open and closed positions, the lid having a rectangular frame supporting a flexible net, the semi-cylindrical trough dimensioned to contain a first longitudinal portion of the cylindrical bale of hay, the flexible net configured such that the net covers over a second longitudinal portion of the cylindrical bale of hay when the lid is closed, wherein the semi-cylindrical trough comprises a plurality of parallel elongated members having opposite ends mounted to a rectangular frame at their opposite ends each of the elongated members being shaped into a semicircle, the rectangular frame forming the rim and having opposite first and second sides and opposite first and second ends the parallel elongated members being mounted to the first and second sides of the rectangular frame, first and second semicircular members being fixed on the first and second ends of the rectangular frame parallel to the elongated members, the elongated members being spaced apart.

2. A hay feeder for enclosing a cylindrical bale of hay having opposite first and second longitudinal portions, the hay feeder comprising a semi-cylindrical housing dimensioned to enclose the first longitudinal portion of the cylindrical bale, the semi-cylindrical housing having an arched bottom and an open top having a rim, a lid configured to fit the rim to close the open top, the lid comprising a frame supporting a flexible net dimensioned to enclose the second longitudinal portion of the cylindrical bale when the lid is closed on the semi-cylindrical housing, wherein the semi-cylindrical housing comprises a plurality of parallel elongated members having opposite ends mounted to a rectangular frame at their opposite ends, each of the elongated members being shaped into a semicircle, the rectangular frame forming the rim and having opposite first and second sides and opposite first and second ends, the parallel elongated members being mounted to the first and second sides of the rectangular frame, first and second semicircular members being fixed on the first and second ends of the rectangular frame parallel to the elongated members, the elongated members being spaced apart.

3. A method of loading the hay feeder defined in claim 2 with the cylindrical hay bale comprising the steps of positioning the lid to the side of the housing, rolling the cylindrical hay bale onto the lid and pressing down on the rim where the lid is connected with sufficient force to lift the trough and position it towards the cylindrical hay bale, rolling the cylindrical hay bale over the lid and into the trough, then closing the lid with the cylindrical hay bale positioned within the trough.

* * * * *